March 30, 1926.  1,579,073
H. L. BULLOCK
CONDENSATION DRAIN DEVICE
Filed April 13, 1925   2 Sheets-Sheet 1

WITNESSES
Bernard Aebly
A.W. Poster

INVENTOR
HARVEY L. BULLOCK
BY Munn Co
ATTORNEYS

March 30, 1926.

H. L. BULLOCK 1,579,073

CONDENSATION DRAIN DEVICE

Filed April 13, 1925   2 Sheets-Sheet 2

INVENTOR
Harvey L. Bullock.
BY
ATTORNEYS

WITNESSES

Patented Mar. 30, 1926.

1,579,073

UNITED STATES PATENT OFFICE.

HARVEY LESTER BULLOCK, OF NORTH WHITE PLAINS, NEW YORK.

CONDENSATION DRAIN DEVICE.

Application filed April 13, 1925. Serial No. 22,825.

*To all whom it may concern:*

Be it known that I, HARVEY L. BULLOCK, a citizen of the United States, and a resident of North White Plains, in the county of Westchester and State of New York, have invented a new and Improved Condensation Drain Device, of which the following is a full, clear, and exact description.

This invention relates to condensation drain devices and more particularly to an automatically controlled valve mechanism adapted to be operatively connected to the air system of an air brake apparatus or any other power mechanism, an object of the invention being to permit the water which condenses in the tank to be automatically drained.

A further object is to provide a device of this character in which the water which condenses in an apparatus is ejected in spurts whenever the governor blows off and which also blows when the pressure in the tank falls to a predetermined degree.

With these and other objects in view, the invention consists in certain novel features of construction and combinations and arrangements of parts, which will be more fully hereinafter described and pointed out in the claims.

In the accompanying drawings—

Figure 3 shows diagrammatically an air brake system with my invention applied thereto.

Figure 1:
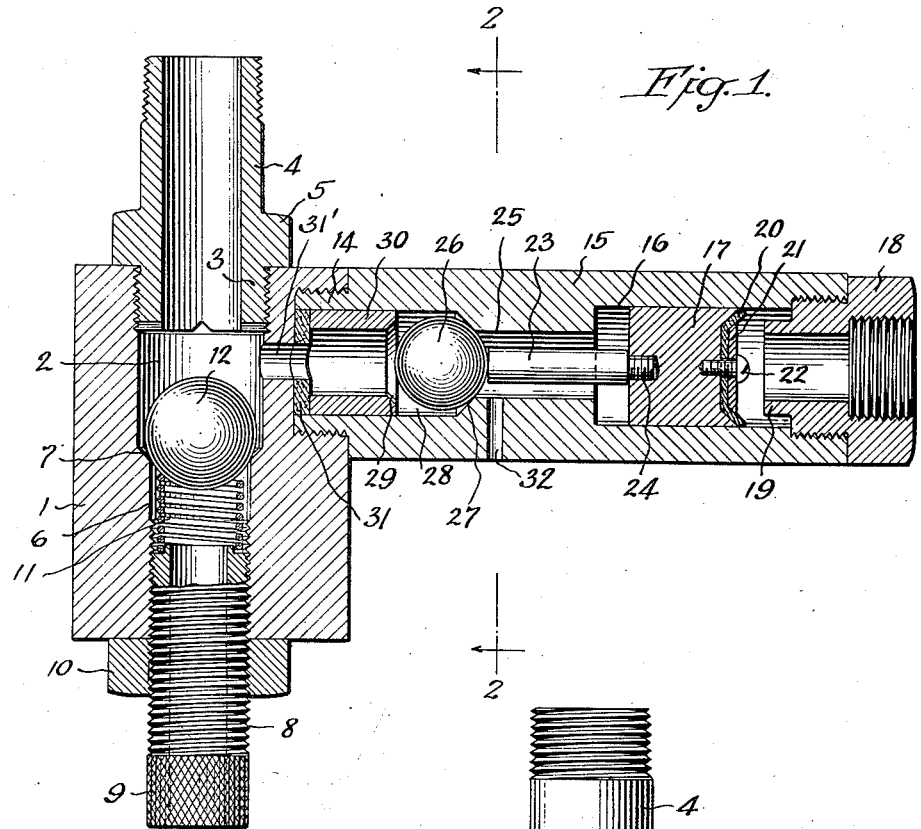
Figure 1 is a view in longitudinal section illustrating my improved device.
Figure 2:
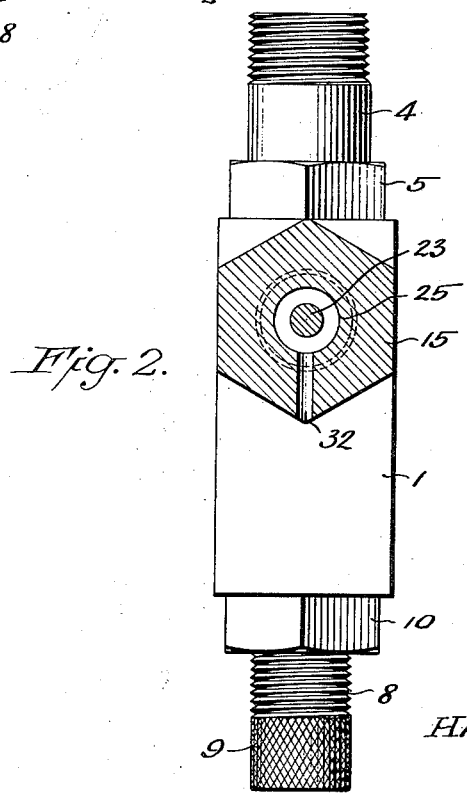
Figure 2 is a view in transverse section on the line 2—2 of Figure 1.

1 represents a metal block having a longitudinal bore 2 in its upper portion, the wall of this bore being screw-threaded for the reception of a threaded nipple 3 on a tubular coupling 4, the latter having an angular wrench-receiving portion 5.

The lower portion of the block 1 is formed with a bore 6 which is concentric with the bore 2 but smaller in diameter than the bore 2. A valve seat 7 is formed internally of the block 1 at the point of juncture between the longitudinal bores 2 and 6.

The lower end of the wall bore 6 is screw-threaded to receive a cylindrical externally screw-threaded tube 8, the latter having a knurled lower end 9 and a lock nut 10 thereon which is jammed against the block 1 to secure the tube 8 at the desired adjustment.

A coil spring 11 is seated on the upper end of the tube 8 in the bore 6 and exerts pressure against a ball valve 12, the latter normally seated against the seat 7 by reason of the air pressure in the tank (not shown) to which the pipe or coupling 4 is connected.

The block 1 is made with a screw-threaded socket 13 in one side into which a threaded nipple 14 on a tubular arm 15 is tightly screwed. This arm 15 at its outer end has a longitudinal bore 16 constituting a cylinder in which a piston 17 is movable. An angular plug tap 18 is screwed into the outer end of the arm 15 and has a projection 19 thereon constituting a piston stop. The piston 17 is provided with a cup washer 20 secured in place by a disk 21 and a screw 22 so as to prevent leakage around the piston.

A rod 23 is fixed to the piston 17, preferably, by screwing one end of the rod into a recess in the piston as shown at 24. The rod 23 is of appreciably less diameter than that portion 25 of the bore of arm 15 in which it is movable, and the free end of said rod is adapted to engage a ball valve 26 normally located against a seat 27.

The valve 26 is movable in a cylindrical chamber 28 between the seat 27 and a seat 29 on a sleeve 30 which fits the chamber 28. A port 31' connects the bore 2 with chamber 28 and a gasket 31 is located between the sleeve 30 and the block 1 to insure an airtight juncture of the parts. A water discharge orifice 32 is formed in the arm 15 and communicates with the reduced bore 25 back of valve 26.

The operation of my improved device is as follows:

As shown diagrammatically in Figure 3 the pipe or coupling 4 is connected with the air tank 40 and receives therein by gravity water which condenses in the tank. The plug tap 18 is connected to an electric governor 41 by means of pipes 42 and 43. The pipe 42 has an extension 44 which connects with the air brake cylinder 45. A valve 46 in pipe 44 is employed for closing the pipe line 44 to the air brake cylinder when the governor 41 is used while a valve 47 in the pipe line 42 is employed for closing said line to the governor when the brake cylinder is used. A pump 48 is shown diagrammatically and connected to the pipe 49 to the main reservoir 40. All of the parts just described constitute standard equipment of an air brake system and my automatic condensation drain device is shown attached with the main air reservoir but it may be employed in any position where intermittent pressure can be obtained and this is particularly true of an electric governor.

The parts are shown in normal position. As the water accumulates in the bore 2 of block 1 it will flow through the port 31' into the chamber 28. Whenever the governor blows off, the pressure will be sufficient to move the piston 17 and rod 23 to the left of Figure 1, moving the ball valve 26 from seat 27 to seat 29. When the pressure from the governor is reduced, the ball valve 26 will move back to the seat 27 and eject a small amount of water through the opening 32. As this operation of moving the ball valve by the governor is frequent this operation serves to eject the condensation in spurts and prevents the over-accumulation of water. When the pressure in the tank diminishes to a certain degree the spring 11 will force the ball valve 12 from its seat 7 and allow the water to flow down through the tube 8 and escape.

Various slight changes and alterations might be made in the general form of the parts described without departing from my invention and hence I do not limit myself to the precise details set forth but consider myself at liberty to make such slight changes and alterations as fairly fall within the spirit and scope of the appended claims.

I claim:

1. A device of the character described, including a cylinder, a piston in the cylinder operated by an air governor, a water accumulating chamber adapted to communicate with an air-tank, a valve in said chamber having two seats spaced apart, and said valve moved from one seat to the other by the action of the piston, and said device having a drain orifice back of the valve through which the water escapes.

2. A device of the character described, including a block having a valve chamber therein adapted to be connected to an air tank, a ball valve normally seated in the lower portion of said valve chamber, a tubular adjusting member in the block, and a spring interposed between said chamber and the ball valve.

3. A device of the character described, including a block having a valve chamber therein adapted to be connected to an air tank, a ball valve normally seated in the lower portion of said valve chamber, a tubular adjusting member in the block, a spring interposed between said member and the ball valve, a tubular arm fixed to the block and communicating with said valve chamber, said arm having a valve chamber therein with valve seats spaced apart, and a ball in said last-mentioned valve chamber movable from one seat to another, and said arm having an escape orifice back of the last-mentioned ball valve.

4. A device of the character described, including a block having a valve chamber therein adapted to be connected to an air tank, a ball valve normally seated in the lower portion of said valve member, a tubular adjusting member in the block, a spring interposed between said member and the ball valve, a tubular arm fixed to the block and communicating with said valve chamber, said arm having a valve chamber therein with valve seats spaced apart, a ball in said last-mentioned valve chamber movable from one seat to another, and said arm having an escape orifice back of the last-mentioned ball valve, a piston movable in the arm, a rod on the piston adapted to engage the last-mentioned ball valve and move it from one seat to the other, and a plug tap in the end of the arm adapted to be connected to an air governor.

5. A device of the character described, including a pair of ball valves having water escape openings back of the same, a spring exerting pressure on one valve, and a piston adapted to move one valve and operated by air pressure.

HARVEY LESTER BULLOCK.